United States Patent
Joshi et al.

(10) Patent No.: US 12,468,504 B2
(45) Date of Patent: Nov. 11, 2025

(54) COMMUNICATION SKILLS TRAINING FOR PRIVATE FEEDBACK IN MULTI-USER COLLABORATION TOOLS AND LIVE EVENTS

(71) Applicant: Yoodli, Inc., Seattle, WA (US)

(72) Inventors: Esha Joshi, Seattle, WA (US); Varun Puri, Seattle, WA (US); Dan Constantinescu, Seattle, WA (US)

(73) Assignee: Yoodli, Inc., Seattle, WA (US)

( * ) Notice: Subject to any disclaimer, the term of this patent is extended or adjusted under 35 U.S.C. 154(b) by 313 days.

(21) Appl. No.: 18/181,878

(22) Filed: Mar. 10, 2023

(65) Prior Publication Data

US 2024/0264797 A1    Aug. 8, 2024

Related U.S. Application Data

(60) Provisional application No. 63/483,211, filed on Feb. 3, 2023.

(51) Int. Cl.
| | | |
|---|---|---|
| *G06F 3/16* | (2006.01) | |
| *G10L 15/02* | (2006.01) | |
| *H04M 9/08* | (2006.01) | |

(52) U.S. Cl.
CPC .............. *G06F 3/165* (2013.01); *G06F 3/162* (2013.01); *G10L 15/02* (2013.01); *H04M 9/082* (2013.01)

(58) Field of Classification Search
CPC ......... G06F 3/165; G06F 3/162; G10L 15/02; H04M 9/082
See application file for complete search history.

(56) References Cited

U.S. PATENT DOCUMENTS

| | | | |
|---|---|---|---|
| 2015/0269929 A1* | 9/2015 | Emery ................... | G10L 15/10 704/254 |
| 2018/0046957 A1* | 2/2018 | Yaari .................. | G06Q 10/1095 |
| 2024/0161765 A1* | 5/2024 | Wojcicki ............... | G06N 3/044 |

* cited by examiner

*Primary Examiner* — Fan S Tsang
*Assistant Examiner* — David Siegel
(74) *Attorney, Agent, or Firm* — Ballard Spahr LLP

(57) ABSTRACT

The disclosed communication skills training tool identifies and analyzes target user data from a multi-user collaboration tool or a live event to provide communication skills training feedback to a target user. The target user is identified based on target user characteristics in the received signal from the multi-user collaboration tool or an input at the live event. A target user performs in a communication event with multiple users on a multi-user collaboration tool or a live event. A signal that includes data from the target user and excludes data from the other users is analyzed to determine feedback appropriate for the target user. That analyzed data is output either in real-time or asynchronously via post-event review.

30 Claims, 5 Drawing Sheets

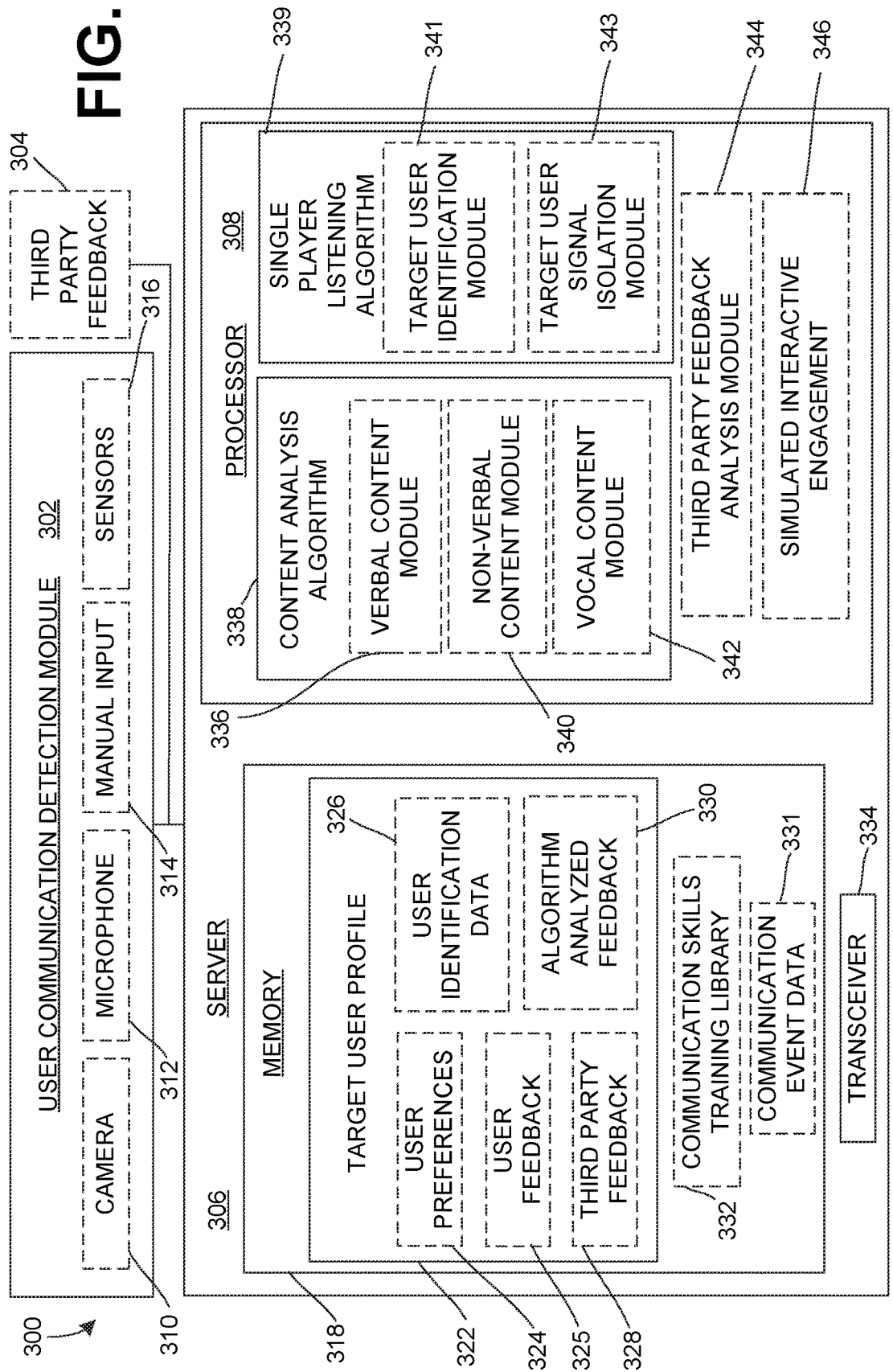

COMMUNICATION SKILLS TRAINING FOR PRIVATE FEEDBACK IN MULTI-USER COLLABORATION TOOLS AND LIVE EVENTS

This application claims priority to U.S. Provisional Patent Application No. 63/483,211, filed on Feb. 3, 2023, and entitled "COMMUNICATION SKILLS TRAINING," which is incorporated by reference herein in its entirety.

BACKGROUND

Communication can be challenging for many people, especially in pressure situations like public speaking, interviewing, teaching, and debates. Further, some people find communication more difficult in general because of a language difference, a personality trait, or a disability. For example, a nervous person may often use filler words, such as "umm" and "uhh" instead of content rich language during the communication or may speak very quickly. Other people may have a speech impediment that requires practice or may have a native language accent when they wish to communicate with others of a differing native language. Even skilled public speakers without physical, language, or personality barriers to their communication tend to develop habits that can be damaging to the success of their communication. For example, some people use non-inclusive language (words or phrases that may treat others unfairly, be insulting or exclude a person or group, whether intentional or not) or "up talk" (raise the tone of their voices at the end of a statement rather than a question).

Because communication is such a critical skill for success across all ages and professions, some people choose to engage with communication improvement tools such as communication or speech/speaker coaches or skill improvement platforms to help them improve their communication skills. These tools tend to track metrics like pace, voice pitch, and filler words but lack an ability to drive real skill specific growth. Rather, they tend to be good at helping users rehearse specific content but not at improving their underlying communication skills. Such coaches and platforms tend to be communication event specific—rehearsing for a speech, for example—rather than targeting improvement in a particular communication skill. People who engage with these coaches and platforms find they improve their presentation for their intended specific purpose but lack the growth they would like to enjoy by improving the foundational skills that are ubiquitous to all good communication.

Further, digital collaboration tools have become a foundation for many people to easily conduct business and personal affairs. With the adoption of digital collaboration tools to everyday life, comes the need to help people improve their skills during meetings with multiple users, such as a business meeting or interview, for example. However, many states in the United States prevent the recording or tracking of a user without consent, which leaves the conventional communication skills training tools unavailable for use during these multi-user meetings and for live events. Instead, a user is forced to practice before the meeting or event, then hope they perform well during the event whether it is a digital meeting or a live event. No real-time or asynchronous feedback is available for these events without first obtaining consent of all attendees. Many people avoid the obstacle of obtaining such consent or do not wish to inform the other attendees that they are engaged in communication skills coaching. This situation results in users simply avoiding use of the conventional communication skills coaching tools for the events, which leaves them without real-time or post-event support to further grow their communication skills.

What is needed in the industry is a tool for improving communication skills that allows users to enhance their foundational communication abilities without informing others involved in the meeting or event in a way that complies with all privacy laws that apply to such situations.

BRIEF DESCRIPTION OF THE DRAWINGS

Non-limiting and non-exhaustive embodiments of the invention are described with reference to the following drawings. In the drawings, like reference numerals refer to like parts throughout the various figures, unless otherwise specified, wherein:

FIG. 3 is a system diagram of a target user system with a single player listening algorithm.

DETAILED DESCRIPTION

Figure 1:
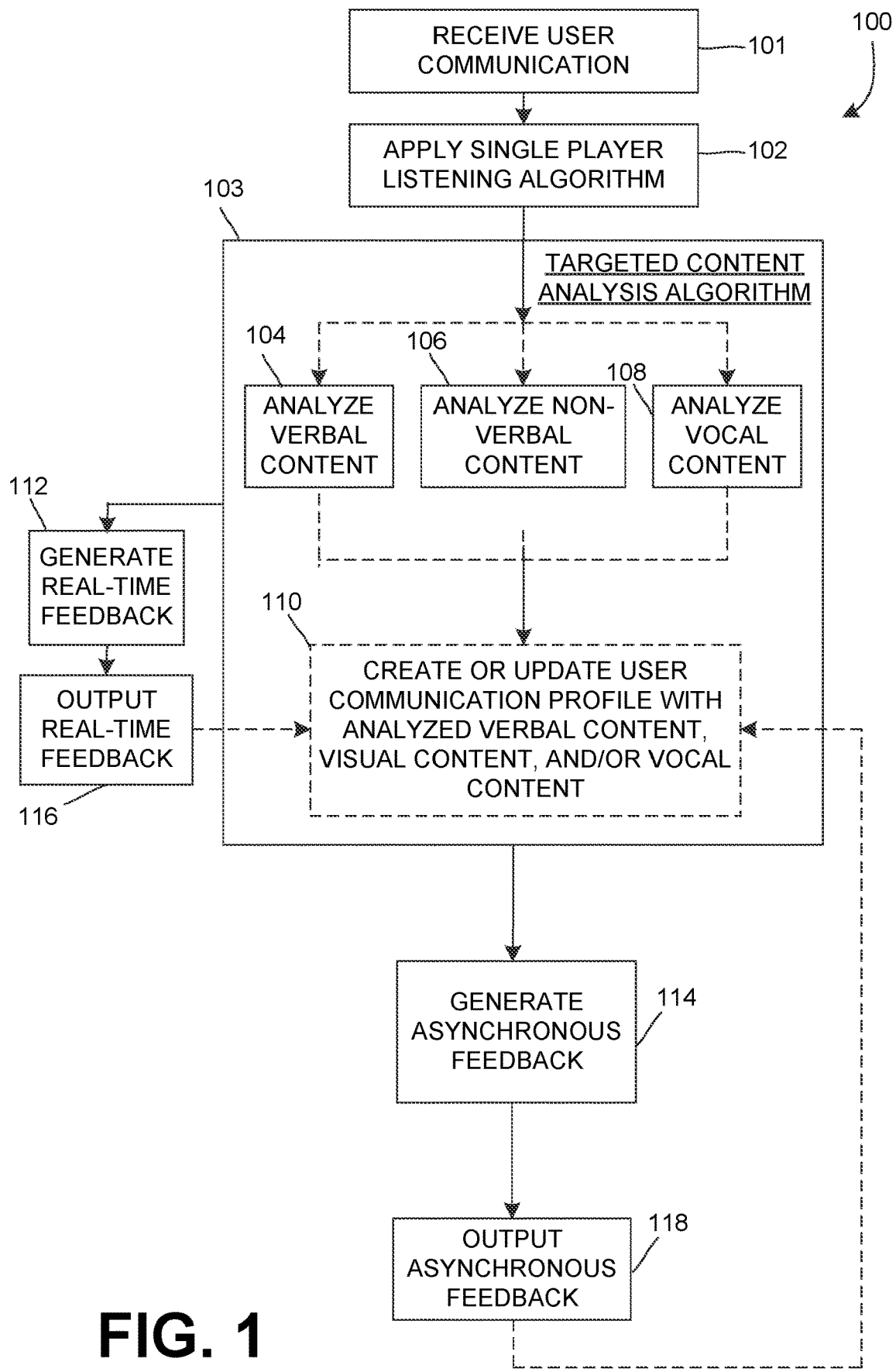
FIG. 1 is a flow diagram for training users on communication skills.

The subject matter of embodiments disclosed herein is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The disclosed systems and methods train users to improve their communication skills. Communication is critical to every facet of success in life so it touches all human beings whether they communicate with small groups or in front of large crowds. People suffer from various factors that substantially affect their ability to communicate effectively including stage fright, medical conditions, language barriers, and the like. Some people who wish to improve their communication skills hire expensive communications coaches or spend hours in groups designed to help improve an aspect of communication, such as public speaking. Often, these people who engage in the hard work to improve their communications skills tend to have a particular event or type of communication event in which they frequently engage in mind for which they wish to prepare. That results in an event-specific outcome for those people.

For example, a person hires a communication coach to help them prepare for an important speech. They practice with the coach for months, working on the structure and content of the speech itself, nervous ticks, bad speaking habits or posture, and the like. At the end of this work, the person has a more polished speech ready to give because of the intense, repetitive practice they did specific to the particular speech to be given and the venue at which it is to be given. The person also might enjoy some incremental improvement in their general communication skills as a result of the immense amount of practice. However, that person was never focused on improving the communication skill itself, but instead was focused on improving the quality of a single speech or communication event. The person might receive feedback from the communication coach that they say filler words or hedging words too often, slouch their shoulders when they become tired, or speak too quickly when they are nervous. However, the coach is unable to given them tangible, data-driven feedback that is focused on verbal, non-verbal, and vocal content of the person's communications skills rather than a single performance.

Further, none of the pre-event preparation work focuses on interactive aspects of the event, such as how the person addresses others in a meeting or how the person has a tendency to speak quickly in response to certain types of questions or other target user specific characteristics of a dynamic interaction with others. Instead, the disclosed systems and methods allow a target user to receive focused feedback—either in real-time or asynchronously of the event—by creating a single player listening signal of the target user and excluding signal(s) from other non-target user(s) engaged in the communication event. The single player listening signal is isolated or filtered from the other signals received by the system. The isolation or filtering of the target user signal allows the system to analyze only the target user without ingesting, analyzing, storing, or otherwise engaging with the signals of non-target user(s). This isolation or filtering process provides a "private" way to analyze, store, and provide feedback only to the target user and avoids analyzing, storing, or providing feedback to non-target users.

The isolation or filtering process can occur in several ways. The first embodiment queries a target user profile that includes one or more characteristics of the target user. For example, this target user profile is created using various audio or video samples of the target user. The audio or video signal produces target user signal characteristics that are stored and analyzed for various unique features. In some examples, a target user signature is created based on one or more of the target user signal characteristics, and in some examples a combination of target user signal characteristics. When the system receives input from the target user and one or more non-target users, a target user or single player listening algorithm queries the target user profile for one or more target user characteristics or the target user signature, whichever the case may be, to identify which input is from the target user. Because input is received from multiple audio devices in many examples, the system can also apply an echo cancellation algorithm, in some examples, that creates only a signal that includes the target user and specifically excludes any input from other non-target users. This resulting target user signal is analyzed for communication feedback for the target user. The target user signal can also be stored and, in some cases, used to train a machine learning (ML) or artificial intelligence (AI) model to identify the target user during a future event.

In another example, the single player listening algorithm uses a target user match module to analyze an input signal from one or more users that includes the target user and one or more non-target users. The target user match module matches a target user characteristic(s) or target user signature signal to one of the input signals to identify that signal as the target user signal. In some examples, the target user match module works with an ML or AI target user detection module to continuously build a better and more accurate matching algorithm for the input signal to the target user.

The ML or AI target user detection module further defines the target user characteristic(s) or target user signature signal upon which the single player listening algorithm identifies the target user signal. That identified target user signal-regardless of the manner in which it is identified by the system-is filtered or isolated from the non-target user signals received. The system excludes the non-target user signals. This combination of analyzing the target user signal and excluding the non-target user signals creates a single player listening signal that allows only the target user to be analyzed. The single player listening signal may be stored, analyzed, used to train ML or AI models (such as the target user match module, for example), and the like. The system then generates communication skills recommendations based on the target user signal or single player listening signal data.

The disclosed systems and methods can be employed during a virtual or a live event. For virtual events, a multi-user collaboration tool, such as a virtual meeting platform, receives input from multiple users, including the target user and one or more non-target users. The system then identifies the input from the target user and only analyzes that signal, excluding signal input from the non-target user(s). During live events, the system again identifies the target user although in this example, it is possible that only one signal exists from a device receiving the target user signal, such as a microphone, for example. Audio or video from non-target users may or may not be received from the target user device. If it is received, the system excludes it based on it not matching the target user characteristic(s) or signal signature. If it is not received, the system bypasses the matching process and focuses on analyzing only the target user signal.

The disclosed systems and method create a "single player listening" environment in which non-target users are excluded or canceled from any analysis because their signal(s) are simply not ingested into the algorithm and is excluded before any content is analyzed for substantive feedback on the communication. A single player listening signal is one in which only the target user is included for further analysis and communication feedback.

After the target user signal is ingested, the disclosed systems and methods analyze the verbal, non-verbal, or vocal content of the target user signal and generate recommendations for the target user based on this analysis. The disclosed systems and methods then output the recommendations. The output can be to a data store for later review, such as a post-event or asynchronous review or can be output in real-time during the event by displaying a target user prompt or other prompt to indicate to the target user some feedback on their communication skills.

The disclosed systems and method output the recommendations to various outputs, such as a display of a computing device (mobile, laptop, etc.), a haptic output, a wearable, vehicle entertainment systems, etc. The output can be transmitted to any connection between the target user and the disclosed systems and methods.

The disclosed systems and methods provide users with feedback over time on the verbal, non-verbal, or vocal content of their communication skills. Verbal content includes the words actually spoken by the person—the content and its organization. For example, verbal content includes non-inclusive language, disfluencies (e.g., filler words or hedging words), specific jargon, or top key words. Specifically, disfluencies are any words or phrases that indicate a user's lack of confidence in the words spoken. Filler words such as "umm" or "uhhh" and hedging words such as "actually," basically," and the like tend to indicate the user is not confident in the words they are currently speaking. Any type of disfluency can be included in verbal content or a grouping of disfluencies multiple types or as a whole category can also be included as verbal content. Non-verbal content includes the body language or physical position, composure, habits, and the like of the user. For example, non-verbal content includes eye contact, posture, body gesture(s), and user background(s)—the imagery of the audience view of the user, the user's motion(s) and movement(s), and their surroundings or ambient environment. Vocal content includes features or characteristics of the user's voice, such as tone, pitch, volume, pacing, and the like.

For example, FIG. 1 shows a method of training users on communication skills 100. The users training on communication skills are engaged in a communication event with others. The communication event can be a live event and can be in-person, virtual, or a combination of both. The disclosed communication skills training methods 100 receive a user communication 101 that is in the form of a signal representing video, audio, or a combination of user data. Typically, the user communication is transmitted from a user device or another audio or video source, such as a microphone, optical device, or other computing device. The other audio or video source can be a device not associated with a user, such as a microphone or video device at a live, in-person event, for example. The user communication can be transmitted from any device and received by the disclosed communication skills training methods.

The communication skills training methods apply a single player listening algorithm 102 that helps identify a target user of multiple users engaged in the communication event. The target user is the user engaged in the communication skills training. The applied single player listening algorithm identifies the target user among multiple target users engaged in the communication event. In some examples, the method engages a single target user and in other examples, the training method engages multiple target users. In the example with multiple target users, each target user is treated individually, which means that each target user is trained on their performance and criteria for improving their communication skills. Alternatively, in the example with multiple target users, groups of target users can be analyzed together, if desired. The user(s) that are not being trained on their communication skills are the non-target user(s) in the disclosed systems and methods. The non-target user(s) can be a single non-target user or multiple non-target users. The communication skills training methods can be used by any number of target user(s) and non-target user(s).

The applied single player listening algorithm 102 identifies the target user portion of the received user communication. The target user portion is then analyzed by a targeted content analysis algorithm 103 that includes several modules to analyze the target user portion. It analyzes any one or multiple of verbal content 104, non-verbal content 106, and/or vocal content 108, as appropriate based on user selections or the type of signal received in the user communication. For example, a user may wish to only receive feedback on verbal content and is disinterested in feedback on body language. That user could pre-select an option for the targeted content analysis algorithm to focus its analysis only on the verbal content of a video input that includes both verbal (audio) and non-verbal (video) content. A user can choose to have the targeted content analysis algorithm analyze any component or all of the verbal, non-verbal, and vocal content of the received user communication. The targeted content analysis algorithm is focused on analyzing only the target user portion of the received user communication. As shown in FIG. 1, the single player listening algorithm is applied to the received user content 102, which means that the non-target user portion of the received user communication is filtered or isolated away from the target user content and ignored, discarded, or otherwise left unanalyzed by the targeted content analysis algorithm 103.

The targeted content analysis algorithm 103 analyzes the target user portion and optionally creates a new user communication profile or updates an existing user communication profile. The user communication profile is a profile for the target user. Any or all of the analyzed verbal 104, non-verbal 106, and/or vocal 108 content for the target user can be added to the user communication profile. The user communication profile stores analyzed verbal content, non-verbal content, and/or vocal content for the target user. The stored content for the target user can be continuously updated each time the target user engages with the disclosed communication skills training methods and systems to further refine the target user's skills to be more accurate in each iteration of the content analysis 110.

For example, the disclosed communication skills training system and methods can be powered by ML or AI that compares a current input content to previously stored content-either user stored content or content from a sample, such as a speaker that is excellent in a desired skill of focus for user. Standard ML or AI techniques can be used to compare a current content sample to the existing content. When the current content sample is compared to a user's prior content, the user can begin to learn where they are improving (or not) over time. Their progress can be tracked, and they can set goals and standards they wish to meet based on the comparison of their content to past content. The user, third parties, or a content analysis algorithm provide feedback to the user on the content provided. The user can input feedback about their own content by replaying the content or adding notes into the disclosed system. Third parties can do the same. The content analysis algorithm also generates feedback from the user's content. This feedback can be asynchronous with or in real-time during the communication event. In some systems, some of the feedback is asynchronous and other feedback is output in real-time to the user. For example, the content analysis algorithm provides real-time feedback to the user while the user reviews the content after the event concludes. Third party mentors and friends can provide their feedback in both real-time and asynchronously in this example. The communication recommendation can be in any suitable form, such as a user alert or prompt with either recommendations or values indicating a level of performance, that can be output in real-time during the current communication event or as a post-event feedback.

The targeted content analysis algorithm 103 can also output the analyzed content or the any portion of the created or updated user communication profile. The output can be transmitted to the target user, a third party, or multiple entities, as needed. The targeted content analysis algorithm 103 generates real-time feedback 112 and then outputs the real-time feedback 116. The output real-time feedback can be sent to any destination or entity, including multiple options.

For example, the real-time feedback could be sent to the target user in the form of a haptic output to a target user wearable device and a prompt or notification on a target user device, such as a tablet or laptop. In this example, the haptic output indicates to the target user that an aspect of their communication skills is not within an acceptable range, falls below a threshold, or otherwise includes a characteristic that is undesirable or that the target user wishes to know about in real-time during a communication event. In this example, the target user may wish to receive a haptic output reminder on their wearable when their speech rate exceeds a certain threshold to remind them to slow down their speech because this may be an aspect of communication that that the target user wishes to improve. In another example, the user may wish to receive a visual alert on a tablet used during the communication event if the user fails to mention a topic that is on a list of topics that the target user wishes to present at the communication event to visually remind the target user which topic they missed so they can cover it before the communication event ends. In yet another example, a target user may wish to hear a low volume chime to indicate certain time progression of the communication event, such as when a certain number of designated minutes expire for the target user's presentation. These are merely examples of output to a target user based on the analyzed verbal, non-verbal, and/or vocal content. Any suitable or desired output can be transmitted and is not limited to haptic, visual, or audio output or combinations of these outputs.

The targeted content analysis algorithm can also generate asynchronous feedback 114 and output the same asynchronous feedback 118. Asynchronous feedback includes any feedback on the target user's analyzed verbal, non-verbal, and/or vocal content that is output after the communication event occurs, such as post-event analysis and reports to the target user or a third party, such as a mentor.

Figure 2A:
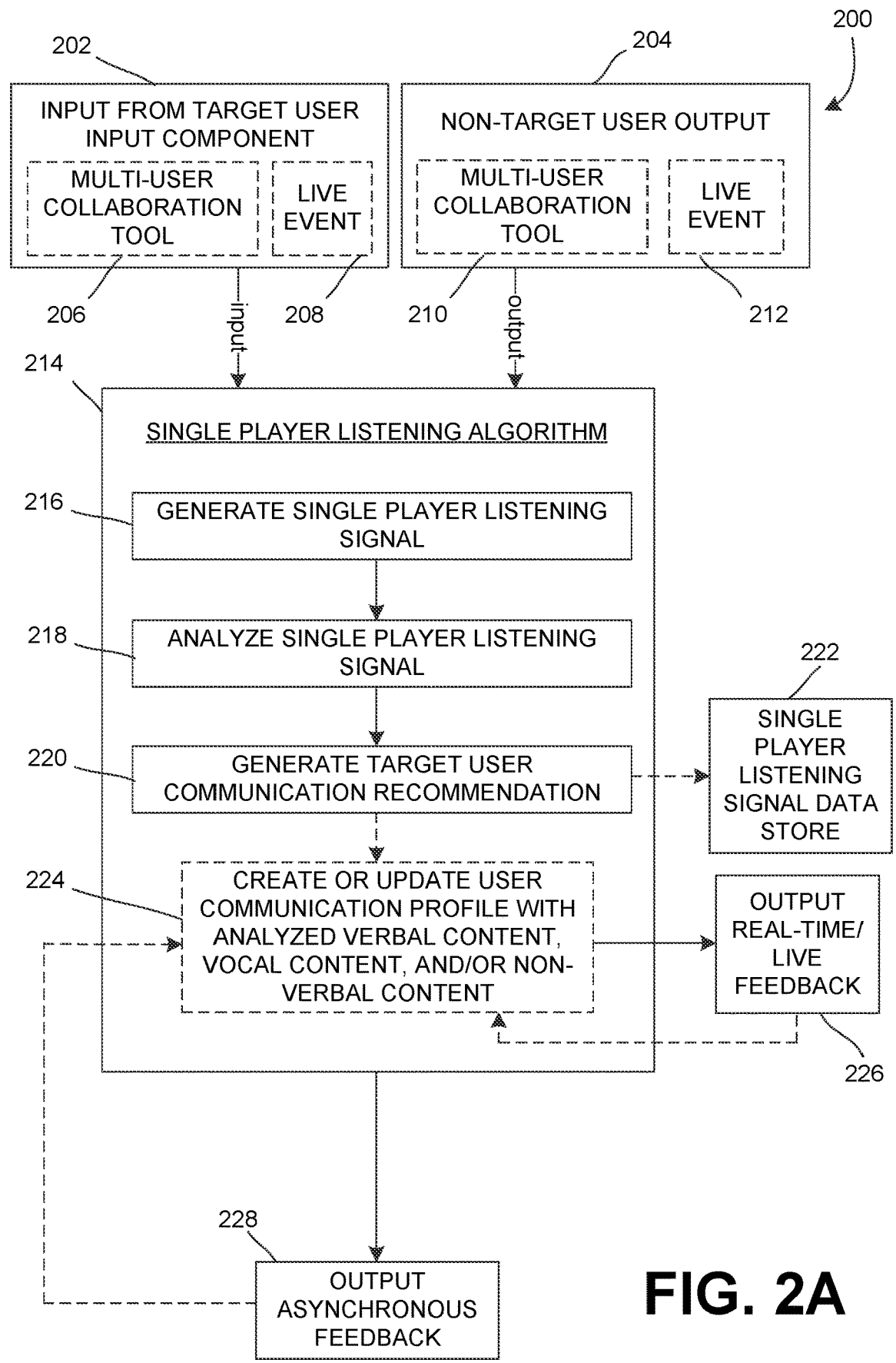
FIG. 2A is a system diagram showing interaction between a target user and a single player listening algorithm.
Figure 2B:
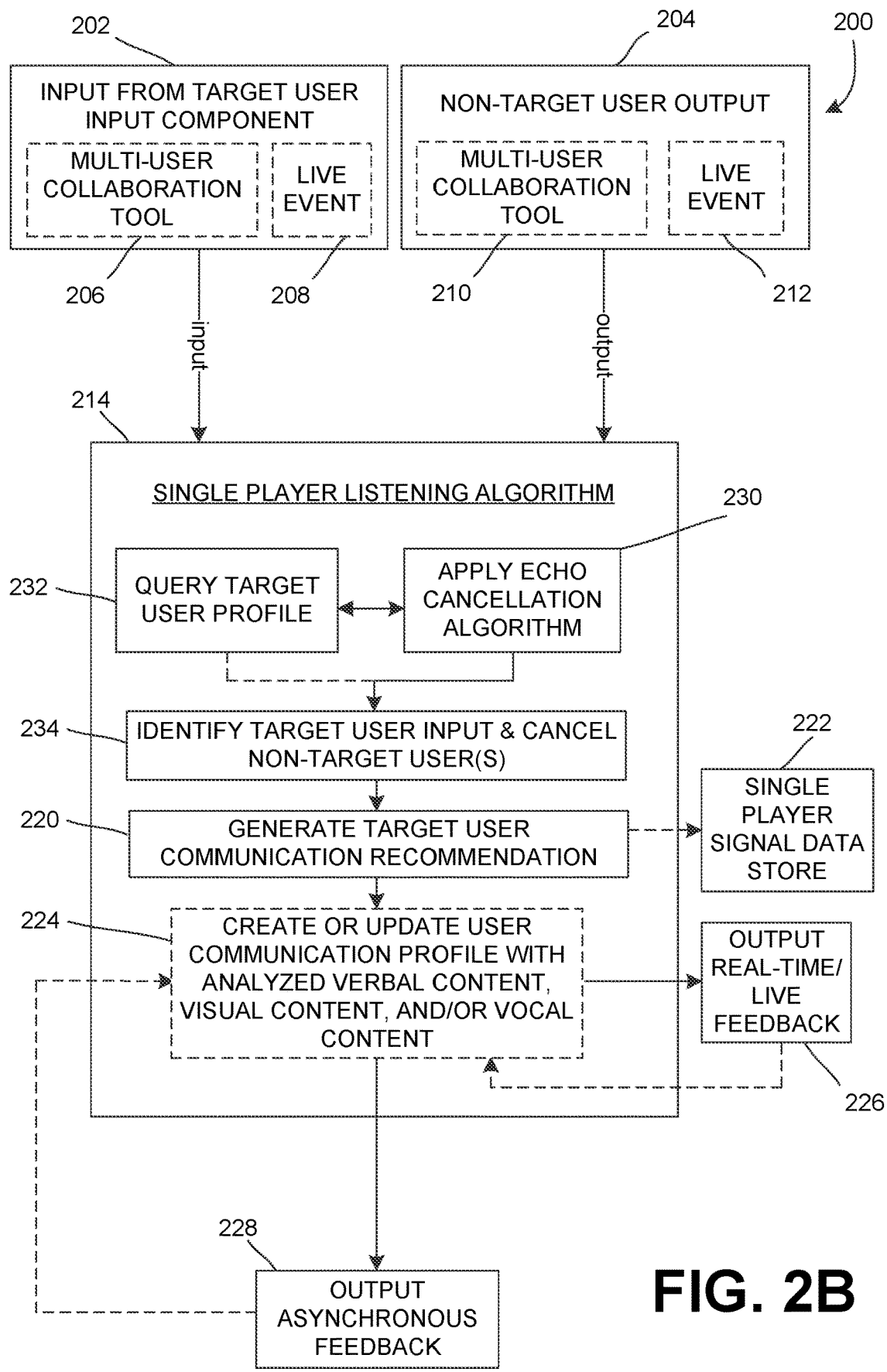
FIG. 2B is another system diagram showing interaction between a target user system and a single player listening algorithm.
Figure 2C:
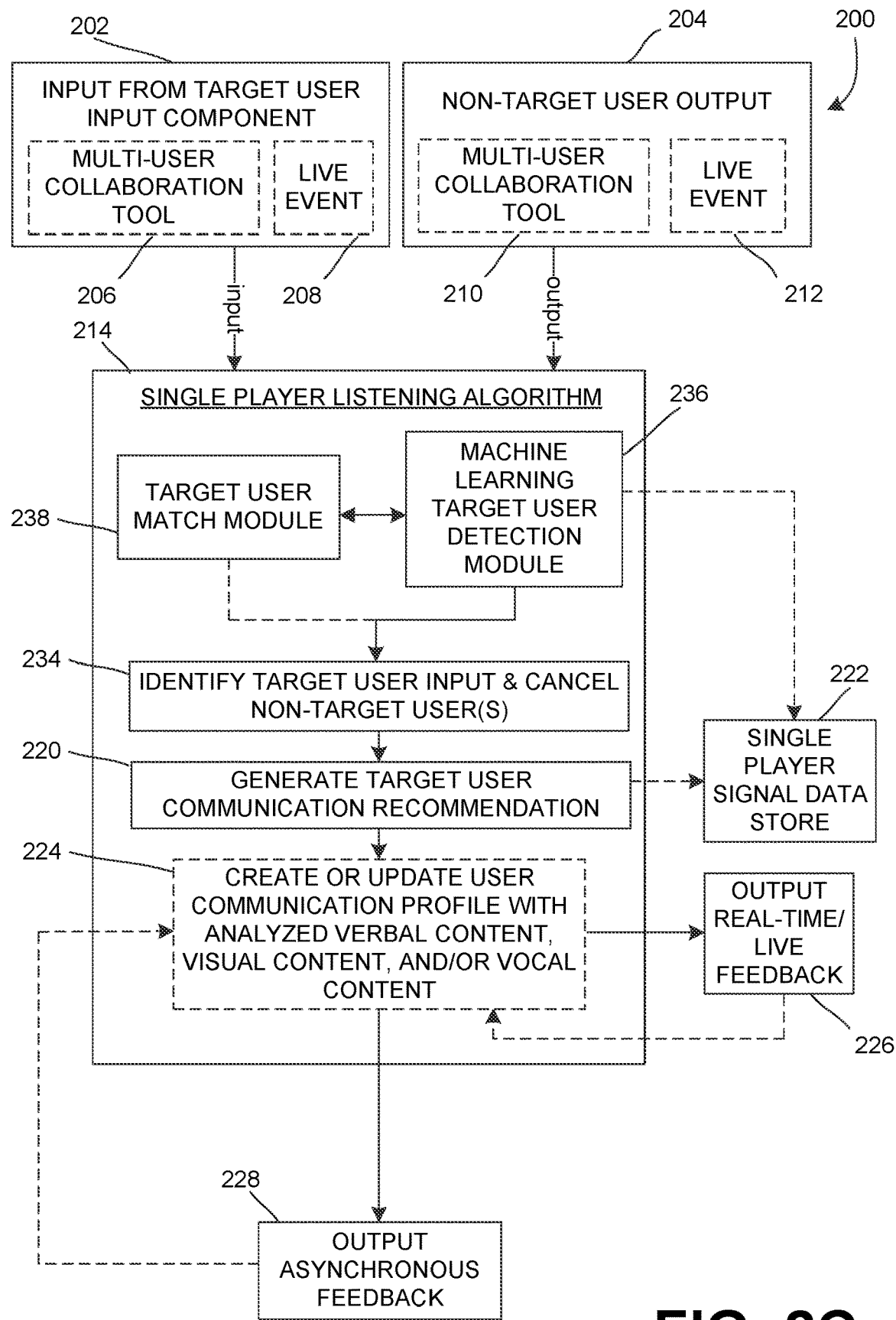
FIG. 2C is yet another system diagram showing interaction between a target user system and a single player listening algorithm.

FIGS. 2A-2C show various example embodiments of system diagrams 200 showing interaction between a target user and a single player listening algorithm. The target user input component 202 is the system component that receives input from the target user and transforms it into an electrical signal representing the target user input. This target user input signal has unique signal characteristics to the target user and is the signal that the system 200 analyzes for verbal, vocal, and non-verbal feedback.

In FIG. 2A, the system 200 receives input 202 from a target user input component 202 and a non-target user output 204. The target user input component 202 can be any suitable component that receives target user input 202, such as one or multiples of a microphone, optical input (ex: a video camera), or the like. The target user input component 202 can, in some examples, but built into a target user device, such as a laptop or tablet, or alternatively could be a standalone device, such as a microphone or camera. In some examples, the target user is prompted to input the target user component selection from multiple available selections. This example embodiment occurs, when multiple options are available for the user to input target user input 202 to the system 200. For example, the target user could join from a laptop with two available target user input components available—a built-in video camera and a connected, but distinct standalone video camera separately connected to the computing system.

The system 200 prompts the target user to select the desired video camera before it receives the target user input 202. To do this, the system 200 detects that multiple target user input components are electronically coupled to the system 200 and generates the instruction to output the prompt to the target user to select the desired target user input component. Alternatively, the system 200 can assign a default target user input component when multiple options are available that the user manually changes if they wish to use a different option. The system 200 then relies on either the target user selected or the default target user input component for receiving the target user input 202, which includes the target user signal—video, audio, or both.

The input from the target user 202 is received from one or both of a multi-user collaboration tool 206 or a target user input component at a live event 208. The multi-user collaboration tool 206 can include any virtual meeting or video conferencing platform, such as Microsoft Teams®, Zoom® video, Google Meet®, or the like. Each multi-user collaboration tool 206 can select a different way to receive the target user input by either prompting the target user to actively select the target user input component 202 of choice or defaulting to a system choice for the target user input component 202.

The system 200 is also able to receive input from target user at a live event 208. The live event target user input components may be the same options that are available for the multi-user collaboration tools in a virtual environment. In some examples, the system 200 receives the target user input from a live event that it streamed to a virtual event in a multi-user collaboration tool platform or elsewhere in a virtual space. In other examples, the system receives the target user input from a virtual even that is then displayed at a live event with multiple other users (target or non-target users). In the live event example, the input from the target user input component 202 is selected by either the target user or a the live event coordinator, such as a microphone or video camera. Regardless of the type of communication event, the system receives the input from the target user input component of choice or by system default.

The system 200 also receives non-target user output 204, which is the output signal from the non-target user(s). The non-target user output 204 is a signal that has unique characteristics to the non-target users(s) and can be received by the system 200 from either a multi-user collaboration tool 210 or at a live event 212 in a similar manner to the way that the target user input is received by the system 200. Notably, the non-target user output does not prompt the non-target user to choose an input nor does the system 200 set a default. Instead, its non-target user signal is simply received by the system 200 as part of the communication event signals that are generated and received by the system 200. The input source or component for the non-target users is irrelevant to the system 200 because the system 200 only analyzes input from the target user component 202 and isolates, filters, or otherwise removes or excludes all non-target user signal(s).

The system 200 isolates or filters the target user input 202 received from selected or default target user input component(s) from any non-target user output 204 received from target user output component(s). Generally, the system 200 receives input from the target user and one or more non-target users. The system 200 identifies the target user input component 202 from either the target user selection or the default target user input component 202, as described above. That target user input component 202 transmits a signal to a single player listening algorithm 214 for further analysis of the target user's communication skills. The single player listening algorithm 214 generates a single player listening signal 216 from the input from the target user input component 202 by relying on the signal output from the selected or default target user input component 202 and by analyzing that same signal output for characteristics that are unique to the target user.

Identifying the signal as unique to the target user can be done in several ways. To initially identify the target user, the system generates and/or analyzes the signal received from the selected or default target user input component 202 as an authentic signal correlating to input from the target user. The system 200 finds various signal characteristics that are unique in one or more categories related to the target user's communication skills including verbal, vocal, and non-verbal characteristics. For example, the target user's voice pitch and speech speed may increase when the target user becomes nervous during a presentation, which is represented by variations in the target user signal in which the amplitude or frequency of the signal varies in a manner that correlates to the voice pitch or speech speed change. The system 200 identifies these signal characteristics in the target user's signal and generates the single player listening signal 216 from the unique characteristics of the target user. The single player listening algorithm 214 never analyzes the non-target user signal(s) in the same manner. It never receives the non-target user signal(s). Instead, it positively identifies the target user and excludes all other signals from different sources. By positive identification of the target user, the system 200 excludes all other signals as non-target users.

The single player listening algorithm 214 identifies input from the target user by receiving the generated single player listening signal 216 and identifying a unique feature in it that correlates to the target user. For example, the single player listening algorithm 214 identifies one or more signal characteristics of the target user signal(s) that correlate to the target user based on the generated single player listening signal 216. After the single player listening signal 216 is verified to be the target user, it is then analyzed 218 to evaluate the verbal, vocal, and non-verbal feedback for the target user. Based on this analysis, the single player listening algorithm 214 generates a target user communication recommendation 220. Examples of the manner in which verbal, vocal, and non-verbal feedback is generated are found in U.S. patent application Ser. No. 17/657,727, U.S. patent application Ser. No. 17/657,731, and U.S. patent application Ser. No. 17/657,730, each of which is incorporated by reference herein in its entirety.

The single player listening algorithm 214 can also transmit portions or the entirety of any of the target user data or signal(s) to an internal or external data store, such as a single player listening signal data store 222. In the example in which the single player listening algorithm 214 outputs any patient data to an internal or external data store, the data transmitted can include any one or more of the received input from the target user input component 202, the generated single player listening signal, the analyzed single player listening signal, the generated target user communication recommendation(s), and any created or updated user communication profile data and/or the verbal content. For example, the single player listening algorithm could transmit the analyzed single player listening signal 218 and the generated target user communication recommendation 220 to an external single player listening signal data store 222. That transmitted data is stored for later analysis, post-event analysis, third party feedback, and the like. The single player listening algorithm 214 can also output various target user data in real-time or live feedback 226 to the target user or others, such as a mentor or other third party. The single player listening algorithm 214 outputs the real-time or live feedback 226 in parallel or "real-time" with its analysis of the single player listening signal.

For example, the single player listening algorithm 214 outputs the real-time or live feedback 226 as it is generated within the algorithm. That is, when the single player listening signal 216 is generated, it is output in real-time or live feedback and also transmitted within the algorithm 214 to have its content analyzed. Likewise, as the single player listening algorithm 214 generates the target user communication recommendation 220, it can also output the analyzed single player listening signal 218 as real-time or live feedback. Even further, as the single player listening algorithm completes the generation of the target user communication recommendation 220—whether it creates or updates a target user communication profile or not—it can also output the same target user communication recommendation as real-time or live feedback. As soon as the single player listening algorithm 214 ingests/receives, generates, analyzes, or outputs data related to the target user, it can be output the same (or any portion of it) as real-time or live feedback from the single player listening algorithm 214 at any one or more of the various steps of data analysis.

The single player listening algorithm 214 can also output any of the above-described target user ingested/received, generated, analyzed, or output data related to the target user for asynchronous feedback to the target user or another party, like a third party mentor. The asynchronous feedback 228 can be sent as an alternative to or in addition to the real-time or live feedback and can be transmitted to the target user or any other entity. A target user is able to customize the type of output that the single player listening algorithm 214 provides to include any variation of real-time or live feedback and/or asynchronous feedback.

FIG. 2B shows another embodiment of the system diagram 200 of FIG. 2A showing interaction between a target user and a single player listening algorithm. In FIG. 2B, the single player listening algorithm 214 generates a single player listening signal by applying an echo cancellation algorithm 230 and optionally querying a target user profile 232 to filter or isolate the target user signal from the non-target user signal(s). The disclosed echo cancellation algorithm 230 analyzes the signals received by the single player listening algorithm 214 to identify the target user signal received from the target user input component 202. However, in both virtual and live events, the target user's audio or video are often incorporated into more than one signal. For example, when the target user joins a virtual event with multiple non-target users, the target user input component 202 ingests the target user audio or video data and translate it to a correlating target user signal. However, the non-target user output also includes some audio and/or video of the target user because the target user signal is output on non-target user device(s) or component(s) in combination or compilation with non-target user(s).

To filter or isolate the target user input from any non-target user input, the single player listening algorithm 214 monitors signals received from non-target user output 204 that may include target user data with a delay and/or non-target user data is filtered or isolate (excluded) from further processing in the single player listening algorithm 214. That is, any received signal that includes target user data with a delay from the signal received from the target user input component 204 is filtered or isolated from processing or storage by the single player algorithm 214. Conventionally, this echo cancellation technique is used to avoid echoes produced by multiple sources with micro-delays between them that would otherwise create a low-fidelity signal. In this disclosed technique, the single player listening algorithm 214 applies the echo cancellation algorithm 230 in a new way—in addition to canceling echoes, it also positively filters or isolates those signals with data from both the target user and non-target users from the target user signal so that non-target user signal(s) are not ingested, processed, or stored by the single player listening algorithm.

The single player listening algorithm 214 can also query a target user profile 232 to help identify the target user. A target user profile includes stored data or information about the target user related to communication skills, habits, goals, past performance, and the like. The target user profile includes any data or information related to the target user's communication skills training. One or more of the stored data or information in the target user profile can be used to create a target user signature that is a unique identifier of the target user and can be used to match an incoming signal to the target user. For example, the target user has a specific pitch and tone to their voice that is represented by correlating signal characteristics in an audio signal of the target user speaking. Those target user signal characteristics are used to evaluate future incoming signals to match them with audio signals received that may be the target user. If the same characteristics of a future audio signal match the "target user signature" stored in the target user profile, then the single player listening algorithm can use that information to help identify that the future signal includes audio from the target user. Such a match between the signal characteristics and the target user signature occurs when the characteristics exceeds a certain percentage of being the same or within an acceptable range of values of the same characteristics in the target user signature or profile.

The single player listening algorithm 214 can use the query of the target user profile 232 to validate the echo cancellation algorithm 230 applied to the input from the target user input component in some example embodiments. Alternatively, the query of the target user profile 232 to identify the target user by matching an incoming signal with the target user profile signal characteristics or target user signature can be used as a parallel technique to identify the target user to applying the echo cancellation algorithm 230 to identify and filter or isolate the input from the target user input component 202.

FIG. 2C shows another embodiment of the system diagram 200 of FIG. 2A showing interaction between a target user and a single player listening algorithm. In FIG. 2C, the single player listening algorithm 214 generates a single player listening signal using a machine learning (ML) target user detection module 236 and optionally a target user match module 238. The ML target user detection module 236 relies on a ML module that can help identify a target user based on the incoming signal(s) correlating to a characteristic of the target user. The target user match module stores data and information related to the target user, including a test signal and a target user profile, as discussed above. The ML model can based its analysis of an incoming signal based on various audio or visual characteristics of the incoming signal, including the component that transmitted the signal (e.g., the target user input component 202) to the single player listening algorithm 214, the target user profile or target user signature, input from the target user that identifies the signal with the target user (e.g., background selection, location, IP address, type of signal, an optical image of the target user to identify physical characteristics, etc.), and the like. The ML target user detection module 236 can use any known audio or visual characteristic about the target user to help identify the target user in an incoming signal.

FIG. 3 shows an example system diagram of a target user system 300 with a single player listening algorithm 339. In the system 300, a user communication detection module 302 is coupled to a server 306 and third party feedback 304. The user communication detection module 302 includes a camera 310, a microphone 312, manual input 314, and other various sensors 316 (e.g., optical or motion sensors), and can be a target user laptop or tablet, for example, whether at a communication event streamed over a multi-user collaboration tool or at a live event. The third party feedback 304 includes input from a third party about the target user that the third party transmits during or after the communication event.

The server 306 has memory 318 and a processor 308. The server 306 includes a stored target user profile 322, as discussed above, a communication skills training library 332, and communication event data 331. The target user profile 322 includes user preferences 324, user feedback 325, third party feedback 328, user identification data 326, and algorithm analyzed feedback 330. User preferences 322 can include goals, preferred ranges for various analyzed communication metrics (e.g. speech speed, content outlines, inclusive language, voice pitch, non-verbal communication habits, themes or tones for the verbal and non-verbal communication, etc.). User feedback 325 can include various feedback that the target user stores in the target user profile 322 about themselves regarding their communication skills. Third party feedback 328 includes feedback provided about the target user's communication skills by a third party, such as a mentor, boss, or coach. The user identification data 326 includes identifying information about the target user, such as personal and geographic location information. The algorithm analyzed feedback 330 includes verbal, vocal, and non-verbal feedback that an algorithm provides after analyzing signals that include audio or video of the target user in previous communication events.

The communication skills training library 332 includes data that is helpful to the target user in improving their communication skills. For example, it can include sample speeches of skilled orators, training videos, filters or algorithms that apply various adjustments to the target user's recorded samples, such as those techniques that can alter a target user's voice, accent, speed, tone, pitch, inclusive language, etc. The communication event data 331 includes data produced by a content analysis algorithm 338 and a third party feedback analysis module 344. Users or third parties can access the stored communication event data about any one or more communication events. For example, the stored communication event data can be video and transcripts of multiple communication events. The target user and any authorized third parties can access that stored communication event data to analyze it for feedback. Some examples allow the user or third parties to manipulate the stored communication event data by applying edits or changes to any of the stored communication event data when it is replayed or reviewed, such as removing or decreasing filler words, increasing or decreasing the speed of the user's speech, adding or removing pauses, and the like.

The user, third parties, or a content analysis algorithm 338 provide feedback to the user on the content provided. The content analysis algorithm 338 is stored in the processor 308 that is coupled to the server 306. The target user can input feedback about their own content by replaying the content or adding notes into the disclosed system. Third parties can do the same. The content analysis algorithm also generates feedback from the user's content. This feedback can be asynchronous with or in real-time during the communication event. In example systems, some of the feedback is asynchronous and other feedback is output in real-time to the user. For example, the content analysis algorithm provides real-time feedback to the user while the user reviews the content after the event concludes. Third party mentors and friends can provide their feedback in both real-time and asynchronously in this example.

The processor 308 of the communication skills training system 300 shown in FIG. 3 includes a content analysis algorithm 338, as mentioned above. The content analysis algorithm 338 receives communication event data and analyzes it, such as by identifying certain parameters or characteristics, generating metrics, evaluating or quantifying certain aspects of the data, and the like. In the example shown in FIG. 3, the content analysis algorithm 338 includes a verbal content module 336, a non-verbal (e.g., visual) content module 340, and a vocal content module 342 that each analyze data relating to respective verbal content, non-verbal content, and vocal content detected by the user communication detection module 302.

For example, the verbal content module 336 can identify top key words or generate a transcript of the communication event. For example, the verbal content module 336 can identify certain words like hedging words (e.g. basically, very, actually, or basically) or non-inclusive words and provide real-time and post-event asynchronous feedback on such metrics. Still further, the verbal content module 336 can identify words that the user emphasizes by pausing or changing the pace of the word as it is spoken, for example. Such verbal metrics can be mapped to a substantive structure of a user's communication event that is either predetermined or generated post-event.

A user could, in an example, upload an outline of key points to address in the communication event. The verbal content module 336 can then map key words it identifies during the communication event to each key point in the uploaded outline and provide metrics to the user either in real-time or post-event regarding the frequency, depth, and other measures relating to the user addressing the key points of the outline. This can also be blended with the verbal content module 336 tracking filler words, such as "uhhh" or "ummm," either as a standalone metric or in combination with the key points of the outline to see during which of the key outline points the user said more filler words. The verbal content module 336 can measure and analyze any data relating to the content spoken by the user.

The verbal content module 336 can also output reminders in response to tracking the verbal, spoken content. Output reminders can be generated and output to the user in real-time during the communication event. For example, if a user is repeating themselves over a particular allowable threshold—identified in similarity by techniques such as natural language processing or keyword detection—the system 300 then triggers an output to the user during the event that the user should progress to the next topic or point in the communication. In another example, the verbal content module 336 can identify a missed point the user wished to make during the communication event based on an pre-defined set of points the user wanted to address during the communication event. If a missed point is identified by the verbal content module 336, then it generates a user prompt to note the missed point and optionally suggest to the user a time or way to bring up the missed point later during the communication event. The suggestion could be timed based on a similarity of the missed point to another point the user wished to make during the communication event that would be part of the pre-defined set of points the user wanted to address.

Even further, the verbal content module 336 can track a user's point for introduction, topics and sub-topic points, supporting evidence or explanation, and conclusion. This tracking can be done by either comparing the verbal content received with the pre-defined content the user inputs or against common words used for introductions, argument or point explanatory development, and conclusions, for example. The tracking can also be used to help prompt a user to move on to the next phase of the point—move from introduction to explaining detail for a first topic, for example. The system can start by identifying key words typically associated with introductions. If the system tracks that the user speaks too many sequential sentences that include typical introduction key words, then the verbal content module 336 can generate a user prompt to encourage the user to progress to the next portion of the point. This can be accomplished by detecting a number of introduction sentences that exceed a threshold, for example, such as three or more sentences identified as introduction content. When the system 300 detects that the user has exceeded the threshold number of introduction sentences, it triggers a user prompt to progress the content to the next portion of the point.

Still further, the user's pre-defined content, such as speaking notes for example, can be mapped to the user's real-time verbal content. The communication skills training system 300 can display an outline of the pre-defined content that is visually shown as having been addressed or not yet addressed during a communication event. Each point in the pre-defined content can be marked addressed or not addressed during the communication event, which appears on the display seen by the user. The display of this tracking of pre-defined content gives the user a visual cue on the remaining content to discuss during the communication event.

In an example, the verbal content module 336 creates a real-time or post-event transcript of the user's verbal content—the precise, ordered words spoken—during a communication event. If the verbal content module 336 creates a real-time transcript, it can also display it for the user or third parties during the communication event. For the post-event transcript example, the transcript can be edited by the user or a third party and can be optionally displayed in simultaneous play with a video capture replay of the communication event. In some examples, the communication skills training system 300 creates both a real-time and a post-event transcript.

The non-verbal content module 340 can identify visual features or parameters of the user during the communication event, which can include the user's position within a speaking environment for example. The user's position can be on a screen if the communication event occurs virtually or can be within a particular ambient environment for the user during a live event. The visual features or parameters can also include body language and position, such as gestures, head tilt, crossed arms or legs, shoulder shrug, body angling, movements typically associated with a nervous demeanor (i.e., foot or hand tapping, rapid eye movement, etc.), and the like. The non-verbal content module 340 can compare captured frames received from the user communication detection module 302 with prior frames of a similar or time-mapped segment of a prior user communication event. Alternatively or additionally, the non-verbal content module 340 can track non-verbal content throughout the entire communication event and compare it to a prior event, an expert event, or a famous person's prior communication event.

The memory 318 stores the communication event data 331 feedback produced by the content analysis algorithm 338 and the third party feedback analysis module 344. Users or third parties can access the stored communication event data 231 about any one or more communication events. For example, the stored communication event data 331 can be video and transcripts of multiple communication events. The user and any authorized third parties can access that stored communication event data 331 to analyze it for feedback. Some examples allow the user or third parties to manipulate the stored communication event data 331 by applying edits or changes to any of the stored communication event data 331 when it is replayed or reviewed, such as removing or decreasing filler words, increasing or decreasing the speed of the user's speech, adding or removing pauses, and the like.

The communication skills training system 300 can also include a simulated interactive engagement module 346. The simulated interactive engagement module 346 includes a simulated person or group of people with whom the user can simulate a live interaction during the communication event. For example, the simulated person could be an avatar or a simulated audience. The content analysis algorithm 338 includes a feature in one or more of its verbal content module 336, non-verbal content module 340, or vocal content module 342 that detects spoken language cues or body language that the system then equates with a likelihood that another person, group of people, or an audience would react in a positive, constructive, or negative manner. For example, if the user is talking too fast (measuring speech speed) or repeating the same point several times (key word detection), the verbal content module 336 would detect the speed of the user's speech or the key word frequency is above a threshold rate or value. If the speed or key word frequency breeches the threshold, the verbal content module 336 generates an avatar or members of a simulated audience, for example, to appear to confused or disengaged. If the user is instead maintaining the speed of their speech within an optimal range and mentioning key words at an optimal frequency, the verbal content module 336 generates the avatar or members of the simulated audience to appear engaged and curious.

The same concept can be applied to the non-verbal content module 340 and the vocal content module 342. The simulated avatar or audience can appear to react in a manner that correlates to the analyzed data relating to the user's body language, position, and movements and also to the users' vocal features and parameters like the user's voice volume, pauses, tone, and the like.

This same simulated interactive engagement module 346 can be useful for training users in multiple types of communication events. The user may wish to practice for an interview, for example with one or more other people. The communication skills training system 300 can receive input from a user about an interview, such as a sample list of topics or interview questions. The simulated interactive engagement module 346 poses the list of questions or topics to the user in a simulated live communication event. As the user progresses through the list of sample questions or topics, the simulated interviewer(s) can be instructed by the simulated interactive engagement module 346 to respond differently depending on the user's metrics in a pervious question or topic. For example, the simulated interactive engagement module 346 tracks key words that a user selected to answer a first question. If the user exceeded a threshold value of the number of times or the variation of the key words used, for example, the simulated interviewer(s) could respond with a pleasant smile or an approving nod.

The transceiver 334 of the server 306 permits transmission of data to and from the server 306. In the example shown in FIG. 3, one or more of the user communication detection module 302, the third party feedback 328, and a user interface (not shown) can be integrated into a single system. Alternatively, one or more of the components can be a remote component, such as the third party feedback algorithm 344 discussed above or an output that is positioned remote from the memory 318 and processor 308 in a distributed computing environment.

The processor 308 also includes the single player listening algorithm 339, as described above. The single player listening algorithm includes a target user identification module 341 and a target user signal isolation module 343. The target user identification module 341 identifies the target user in a signal through one or more of the techniques described herein, including but not limited to identifying a signal from a target user input or source identified by the target user or as a default component, an echo cancellation algorithm, a target user profile or target user signature, or an AI or ML algorithm that identifies the target user in a signal. As discussed above, the signal player listening algorithm 339 filters or isolates the target user signal and excludes all other signals. After the signal player listening algorithm identifies the target user signal, the processor can analyze the target user signal using the content analysis algorithm 338, the third party feedback analysis module 344, and/or the simulated interactive engagement module 346 discussed above. Any target user signal or data produced by any one or more of the content analysis algorithm 338, the single player listening algorithm 339, the third party feedback analysis module 344, and/or the simulate interactive engagement module 346 can be stored in the target user profile 326 in the memory 318 and/or can be output in real-time during a communication event and/or asynchronously after the event ends.

Though certain elements, aspects, components or the like are described in relation to one embodiment or example, such as an example diagnostic system or method, those elements, aspects, components or the like can be including with any other diagnostic system or method, such as when it is desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments are presented by way of examples for purposes of illustration and description. They are not intended to be exhaustive of or to limit this disclosure to the precise forms described. Many modifications and variations are possible in view of the above teachings. The embodiments are shown and described in order to best explain the principles of this disclosure and practical applications, to thereby enable others skilled in the art to best utilize this disclosure and various embodiments with various modifications as are suited to the particular use contemplated. It is intended that the scope of this disclosure be defined by the following claims and their equivalents.

What is claimed is:

1. A communication skills training method for a target user engaged in a communication event with a non-target user, comprising:
   receiving user data from a signal, the user data including target user data and non-target user data;
   based on a target user signal characteristic:
      identifying a target user portion of the signal that includes the target user data, the target user portion of the signal associated with the target user, and identifying a remainder portion of the signal that includes the non-target user data, the non-target user portion of the signal associated with the non-target user;

generating a single player listening signal that includes the target user portion and excludes the remainder portion;

analyzing the single player listening signal based on a target user profile for the target user or an exemplary target user criterion;

generating a target user communication recommendation based on the analyzed single player listening signal;

outputting the generated target user communication recommendation;

determining a confidence score for one or both of the target user portion or the non-target user portion of the signal; and if the confidence score is below a threshold:
outputting an alert indicating that the confidence score is below the threshold,
generating an instruction to stop analyzing the single player listening signal, and
ceasing to generate the target user communication recommendation.

2. The method of claim 1, wherein the communication event is virtual.

3. The method of claim 1, wherein the communication event is in-person.

4. The method of claim 1, wherein the user data includes multiple non-target users.

5. The method of claim 1, further comprising:
analyzing the user data to identify a target user characteristic; and
comparing the target user characteristic to the target user profile associated with the target user.

6. The method of claim 1, further comprising creating the target user profile using a machine learning (ML) or artificial intelligence (AI) model trained to identify the target user during an event.

7. The method of claim 6, further comprising storing the target user profile and the ML or AI model in a data store.

8. The method of claim 1, further comprising storing a portion or entirety of the target user portion of the single player listening signal.

9. The method of claim 1, further comprising filtering the remainder portion from the target user portion of the single player listening signal.

10. The method of claim 9, further comprising creating a single player listening signal based on the filtered target user portion of the single player listening signal.

11. The method of claim 1, wherein the target user signal characteristic includes one or more of a voice profile, speed of speech, a target user voice pattern, a target user behavior, voice pitch, voice tone, speech accent, or other unique identifier of the target user.

12. The method of claim 1, further comprising filtering the remainder portion from the target user portion of the single player listening signal using an echo cancellation algorithm.

13. The method of claim 12, wherein the echo cancellation algorithm is an audio driver based on an audio input source.

14. The method of claim 13, further comprising receiving target user input from the target user that includes a selection of the audio input source.

15. The method of claim 14, further comprising prompting the target user to input the selection of the audio input source.

16. The method of claim 12, further comprising canceling the remainder portion of the single player listening signal based on a selection of an audio input source.

17. The method of claim 15, further comprising canceling the remainder portion of the single player listening signal based on the selection of the audio input source.

18. The method of claim 17, further comprising canceling the remainder portion of the single player listening signal based on the selection of the audio input source and an output of a multi-user collaboration tool hosting the communication event.

19. The method of claim 14, further comprising receiving the selection of the audio input source from a multi-user collaboration tool hosting the communication event or a target user computing device.

20. The method of claim 1, further comprising filtering the remainder portion from the target user portion using multiple active audio drivers, wherein one of the multiple active audio drivers is a single player listening driver configured to analyze a single player listening signal that is based on the target user portion of the single player listening signal.

21. The method of claim 20, wherein the single player listening driver is hidden from other drivers of the multiple active audio drivers.

22. The method of claim 20, wherein the single player listening driver is visible to other drivers of the multiple active audio drivers.

23. The method of claim 1, further comprising using a machine learning (ML) voice detection algorithm, identifying the target user based on the user data from the signal based on the target user profile.

24. The method of claim 23, further comprising identifying the target user based on the user data from the signal based on the target user profile by:
comparing a target user signature associated with the target user profile to a characteristic in the target user data of the signal.

25. The method of claim 24, generating the target user signature associated with the target user by prompting the target user to generate a sample signal with a sample characteristic that correlates to the characteristic in the target user data of the signal.

26. The method of claim 23, wherein the target user profile has multiple categories of target user communication performance.

27. The method of claim 1, further comprising outputting the generated target user communication recommendation to one or multiple of a computing device, a wearable device, or a mobile device.

28. The method of claim 1, further comprising outputting the generated target user communication recommendation in one or both of real-time or asynchronous to the communication event.

29. The method of claim 1, wherein the generated target user communication recommendation is one or multiple of audible, visual, or haptic.

30. The method of claim 1, generating the target user communication recommendation is based on verbal, non-verbal, or vocal content of the single player listening signal.

* * * * *